3,185,713
12-KETO PROGESTATIONAL STEROIDS AND
DERIVATIVES THEREOF
Edward Joseph Becker, Princeton, and Allen Cohen, East
Brunswick, N.J., assignors to Olin Mathieson Chemical
Corporation, New York, N.Y., a corporation of Virginia
No Drawing. Filed Apr. 12, 1963, Ser. No. 272,552
10 Claims. (Cl. 260—397.3)

This invention relates to and has as its objects the provision of novel physiologically active steroids, methods for preparing the same and new intermediates in said preparation.

The final products of this invention can be represented by the formulae

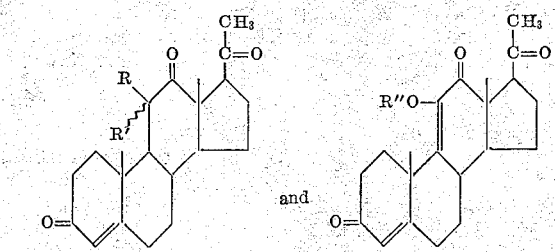

wherein R is hydrogen; R' may be either in the alpha or beta position and is selected from the group consisting of hydroxy and acyloxy and together R and R' is oxo (O=); and R" is selected from the group consisting of hydrogen, acyl and lower alkyl.

The acyl radicals preferred in the practice of this invention are those of hydrocarbon carboxylic acids of less than ten carbon atoms as exemplified by the lower alkanoic acids, such as acetic, butyric and tert.-pentanoic acids; the lower alkenoic acids; the monocyclic aryl carboxylic acids, such as benzoic and toluic acids; the monocyclic aryl lower alkanoic acids, such as phenacetic and β-phenylpropionic acids; the cycloalkane carboxylic acids and the cycloalkene carboxylic acids.

The compounds of this invention are physiologically active steroids which possess progestational activity and thus can be employed instead of progesterone, for example, in the treatment of habitual abortion, for which purpose they can be administered in the same manner as progesterone, for example, the dosage being adjusted for the relative potency of the particular steroid.

The novel products of this invention are prepared by the process of this invention which entail a number of steps starting with 9α-fluoro-11-ketoprogesterone-3,20-bis-ethyleneketal, as starting material. The steps of the process may be represented by the following equations wherein R, R' and R" are as hereinbefore defined:

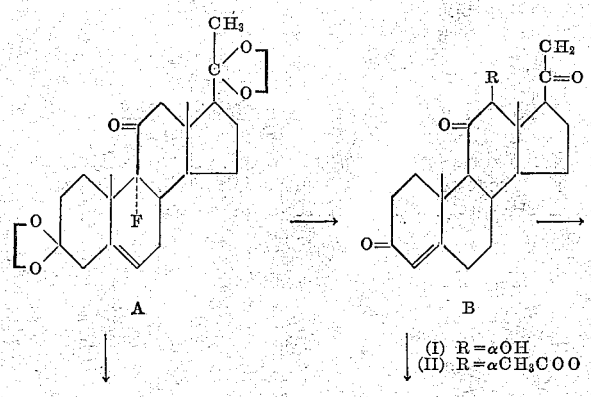

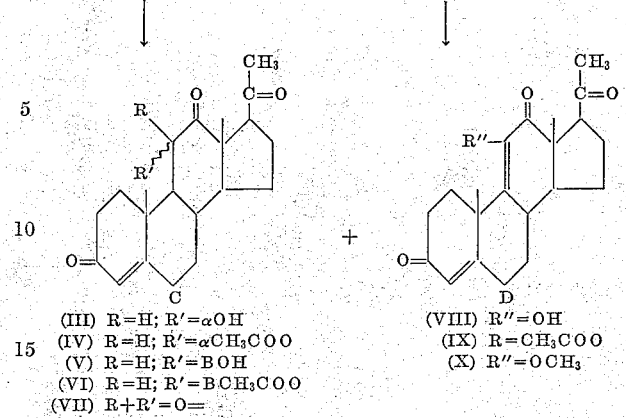

(III) R=H; R'=αOH
(IV) R=H; R'=αCH₃COO
(V) R=H; R'=BOH
(VI) R=H; R'=BCH₃COO
(VII) R+R'=O=

(VIII) R"=OH
(IX) R=CH₃COO
(X) R"=OCH₃

To obtain some of the final products of this invention 9α-fluoro-11-ketoprogesterone-3,20-bis-ethyleneketal is first reacted with methyl lithium and the resultant product hydrolyzed as by treatment with sulfuric acid to yield 11α-hydroxy-12-ketoprogesterone and 12α-hydroxy-11-ketoprogesterone (Compounds C) both of which are new final products of this invention.

In order to obtain the respective 11 and 12 ester derivatives of this invention (i.e. wherein R' and R" is acyloxy, such as CH₃COO), the 11 and 12 hydroxy derivatives are reacted with the desired acylating agent (e.g., acyl chloride or acid anhydride) in the presence of a base, such as pyridine. Although any ester may be thusly prepared, the preferred esters are those with hydrocarbon carboxylic acids of less than twelve carbon atoms. These are formed by reaction with the acyl chloride or acid anhydride of a hydrocarbon carboxylic acid of less than twelve carbon atoms, such as one of the acids listed hereinbefore.

In order to obtain the final products of this invention wherein an 11,12 diketo group or $\Delta^{9(11)}$-double bond is present, the 11α and 12α-hydroxy derivatives are oxidized, as by treatment with bismuth oxide to the 11,12-dioxo and 11-oxygenated-$\Delta^{9(11)}$-progesterones (Compounds D) which are also new compounds of this invention.

In addition to the foregoing, it has been found that the final products of this invention (Compounds C) may be obtained by the conversion of Compounds B, by reaction of said Compound B, with an alkali metal base, such as potassium hydroxide.

An alternate procedure may be employed to obtain the final products of this invention employing 9α-bromo-11-ketoprogesterone. In this procedure, the 9α-bromo-11-ketoprogesterone is reacted with an alkali metal base such as sodium hydroxide to yield the 12α-hydroxy-11-ketoprogesterone (Compounds C) which is a new compound of this invention.

The invention may be further illustrated by the following examples:

EXAMPLE 1

*11α-hydroxy-12-ketoprogesterone (III) and 12α-hydroxy-11-ketoprogesterone (I)*

1500 g. of 9α-fluoro-11-ketoprogesterone 3,20-bisethylene ketal is dissolved in 15 l. of anhydrous benzene. The methyl lithium reagent is prepared by adding 3 l. of methyl iodide to 234 g. of lithium shot agitated in 30 l. of anhydrous ether. For the purpose of this reaction it is essential that an excess of methyl iodide be present. The addition is held at a rate sufficient to maintain a controlled reflux. The solution then stands at 25° C. for 12–16 hours before use.

The methyl lithium reagent is then added to the stirred solution of the steroid at room temperature. Again the rate is such, so as to maintain light reflux. The reaction mixture is allowed to stand at room temperature for 18 hours. The excess reagent is then destroyed by the careful addition of 7.5 l. of methanol, then 7.5 l. of water. The phases are split and the aqueous portion extracted with 30 ml. of chloroform. The combined organic phase is washed with water, dried over sodium sulfate and evaporated to a resinous mass. This material is dissolved in 1.8 l. of hot hexane and kept at 25° C. for 24 hours. The product is collected on a Buchner filter, washed with cold hexane and dried in vacuum to give 382 g., M.P. 170–181° C. A second crop of 136 g. is obtained.

50 mg. of the above material is dissolved in 2 l. of methanol/dioxane 1:1 and 100 ml. of 10% sulfuric acid and heated under reflux for one hour. The methanol solution is cooled, diluted with water and extracted with chloroform. The organic phase is washed with water, dried over sodium sulfate and evaporated to give 42 g. of material which is chromatographed on alumina. Elution of the column with benzene/chloroform 5:2, then 1:1 and finally chloroform gives the following two compounds:

11α-hydroxy-12-ketoprogesterone (III), M.P. 165–168° C., $[\alpha]_D^{24}$ +187° λmax. 240 mμ; εmax. 16,300. Calculated for $C_{21}H_{28}O_4$ (344.43): C, 73.23%; H, 8.19%. Found: C, 73.25%; H, 8.24%;

and

12α-hydroxy-11-ketoprogesterone (I), M.P. 185–190° C., $[\alpha]_D^{24}$ +240° λmax. 238 mμ; εmax. 15,600. Calculated for $C_{21}H_{28}O_4$ (344.43): C, 73.23%; H, 8.19%. Found: C, 73.16%; H, 8.12%.

EXAMPLE 2

*11α-acetoxy-12-ketoprogesterone (IV)*

56 mg. of the 11α-hydroxy-12-ketoprogesterone (III) is dissolved in 1 ml. of pyridine and 1 ml. of acetic anhydride. After 16 hours at room temperature the product is isolated by precipitation with ice and water. It is filtered, dried and recrystallized from acetone/hexane to give the purified product, M.P. 226–228° C., $[\alpha]_D^{24}$ +168° 22.10 mg./2 ml. chloroform.

*Analysis.*—Calculated for $C_{23}H_{32}O_5$ (388.49): C, 71.11%; H, 8.30%. Found: C, 71.19%; H, 8.34%.

Similarly, following the procedure set forth in Example 2, but substituting equivalent amounts of propionic anhydride, benzoyl chloride and butyric anhydride, for acetic anhydride the respective 11α-acyloxy derivatives of 12-ketoprogesterone are obtained.

EXAMPLE 3

*12α-acetoxy-11-ketoprogesterone (II)*

117 mg. of the 12α-hydroxy-11-ketoprogesterone (I) compound is dissolved in 2 ml. of pyridine and 1.5 ml. of acetic anhydride. After 16 hours at room temperature the product is worked up as described in Example 2. Recrystallization from acetone/hexane gives the purified product, M.P. 248–251° C., $[\alpha]_D^{26}$ +257° 20.80 mg./2 ml. chloroform.

*Analysis.*—Calculated for $C_{23}H_{32}O_5$ (388.49): C, 71.11%; H, 8.30%. Found: C, 71.21%; H, 8.34%.

Similarly, following the procedure set forth in Example 3, but substituting equivalent amounts of propionic anhydride, butyric anhydride and benzoyl chloride for acetic anhydride, the 12α-acyloxy derivatives of 11-ketoprogesterone are obtained.

EXAMPLE 4

*12α-hydroxy-11-ketoprogesterone (I)*

10 g. of 9α-bromo-11-ketoprogesterone is dissolved in 500 ml. of dioxane. To this solution is added 4.0 g. of sodium hydroxide dissolved in 300 ml. of water. The reaction mixture is allowed to stand at room temperature for 15 minutes. It is then diluted with 1 liter of water and extracted with 3 x 400 ml. of chloroform. The organic phase is washed free of alkali with water, dried over sodium sulfate and evaporated to a resinous mass. Crystallization with acetone/hexane gives 7.0 g. of product, M.P. 186–190° C., identical in all respects with the 12α-hydroxy-11-ketoprogesterone obtained in Example 1.

EXAMPLE 5

*11,12-dioxoprogesterone (VII) and 11-hydroxy-$\Delta^{4,9(11)}$-pregnadiene 3,12,20-trione (VIII)*

793 mg. of 12α-hydroxy-11-ketoprogesterone is dissolved in 27 ml. of acetic acid. After the addition of 1.48 g. of bismuth oxide the solution is heated under reflux for 30 hours. It is then cooled to room temperature and filtered to remove metallic bismuth and bismuth salts. The solution is then diluted with water and extracted with chloroform 3 x 60 ml. The organic phase is washed with water, dried over sodium sulfate and evaporated to give a mixture of 11,12-dioxoprogesterone and $\Delta^{9(11)}$-11-hydroxy-12-ketoprogesterone. The ultra-violet spectrum of the mixture: λmax. 239 mμ; εmax. 11,930; λmax. 275 mμ; εmax. 4,030.

The mixture may then be separated into its individual components by fractional crystallization.

Similarly, if the 12α-hydroxy-11-ketoprogesterone of Example 5 is replaced by 11α-hydroxy-12-keto-progesterone, 11,12-dioxo-progesterone and 11-hydroxy-$\Delta^{4,9(11)}$-pregnadiene-3,12,20-trione are obtained.

EXAMPLE 6

*11β-hydroxy-12-ketoprogesterone*

250 mg. of 12α-hydroxy-11-ketoprogesterone is dissolved in 20 ml. of methanol containing 2 g. of potassium hydroxide. The solution is heated under reflux for two hours, diluted with water and extracted with chloroform. The organic phase is washed with water, dried over sodium sulfate and evaporated to a pale yellow resin. Paper chromatography shows N 50% starting material, N 30% 11α-hydroxy-12-ketoprogesterone and N 20% 11β-hydroxy-12-ketoprogesterone. The products are then isolated by column chromatography on alumina and elution of the column with benzene/chloroform and chloroform/methanol mixtures.

EXAMPLE 7

*11β-acetoxy-12-ketoprogesterone (VI)*

Following the procedure set forth in Example 2, but substituting an equivalent amount of 11β-hydroxy-12-ketoprogesterone (V) for 11α-hydroxy-12-ketoprogesterone (III) there is obtained 11β-acetoxy-12-ketoprogesterone (VI).

EXAMPLE 8

*11β-hydroxy-12-ketoprogesterone (V)*

250 mg. of 11α-hydroxy-12-ketoprogesterone is dissolved in 10% methanolic potassium hydroxide and treated in accordance with the procedures set forth in Example 6, to yield 11β-hydroxy-12-ketoprogesterone.

EXAMPLE 9

*11-acetoxy-$\Delta^{4,9(11)}$-pregnadiene-3,12,20-trione (IX)*

Following the procedure set forth in Example 2, but substituting an equivalent amount of 11β-hydroxy-$\Delta^{4,9(11)}$-pregnadiene-3,12,20-trione (VIII) for 11α-hydroxy-12-ketoprogesterone (III) there is obtained 11β-acetoxy-$\Delta^{4,9(11)}$-pregnadiene-3,12,20-trione (IX).

EXAMPLE 10

*11-methoxy-$\Delta^{4,9(11)}$-pregnadiene-3,12,20-trione (X)*

Treatment of 11β-hydoxy-$\Delta^{4,9(11)}$-pregnadiene-3,12,20-trione (VIII) with silver oxide and methyl iodide at reflux temperature followed by extraction of the product into chloroform. Evaporation and crystallization from suitable solvent gives 11-methoxy-$\Delta^{4,9(11)}$-pregnadiene-3,12,20-trione (X).

This invention may be variously otherwise embodied within the scope of the appended claims.

What is claimed is:

1. A compound selected from the group consisting of steroids of the formulae

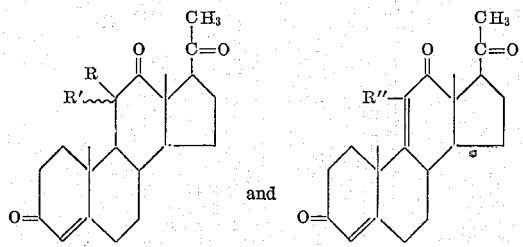

and wherein R is hydrogen; R' is selected from the group consisting of hydroxy and acyloxy; and together R and R' is oxo; and R'' is selected from the group consisting of hydroxy, acyloxy and lower alkoxy; wherein acyl is of a hydrocarbon carboxylic acid of less than ten carbon atoms.

2. 11α-hydroxy-12-ketoprogesterone.
3. 11β-hydroxy-12-ketoprogesterone.
4. 11α-acyloxy-12-ketoprogesterone wherein the acyl radical is of a hydrocarbon carboxylic acid of less than ten carbon atoms.
5. 11,12-dioxoprogesterone.
6. 11-hydroxy-$\Delta^{4,9(11)}$-pregnadiene-3,12-20-trione.
7. 11-acyloxy-$\Delta^{4,9(11)}$-pregnadiene-3,12,20-trione wherein the acyl radical is of a hydrocarbon carboxylic acid of less than ten carbon atoms.
8. 12α-acyloxy-11-ketoprogesterone wherein the acyl radical is of a hydrocarbon carboxylic acid of less than ten carbon atoms.
9. 11-lower alkoxy-$\Delta^{4,9(11)}$-pregnadiene-3,12-20-trione.
10. 11-methoxy-$\Delta^{4,9(11)}$-pregnadiene-3,12,20-trione.

References Cited by the Examiner

UNITED STATES PATENTS

| | | | |
|---|---|---|---|
| 3,010,956 | 11/61 | Thomas et al. | 260—239.55 |
| 3,030,391 | 4/62 | Diassi | 260—397.45 |
| 3,052,694 | 9/62 | Julian et al. | 260—397.5 |

OTHER REFERENCES

Fieser et al.: "Steroids" (1959), copyright by Reinhold Publishing Corp., New York, pages 676 and 609 relied on.

LEWIS GOTTS, *Primary Examiner.*